Jan. 16, 1934.  D. A. SARGENT  1,943,398
COMBINED LOADING AND TRANSPORTING EQUIPMENT
Filed Sept. 19, 1932  3 Sheets-Sheet 1
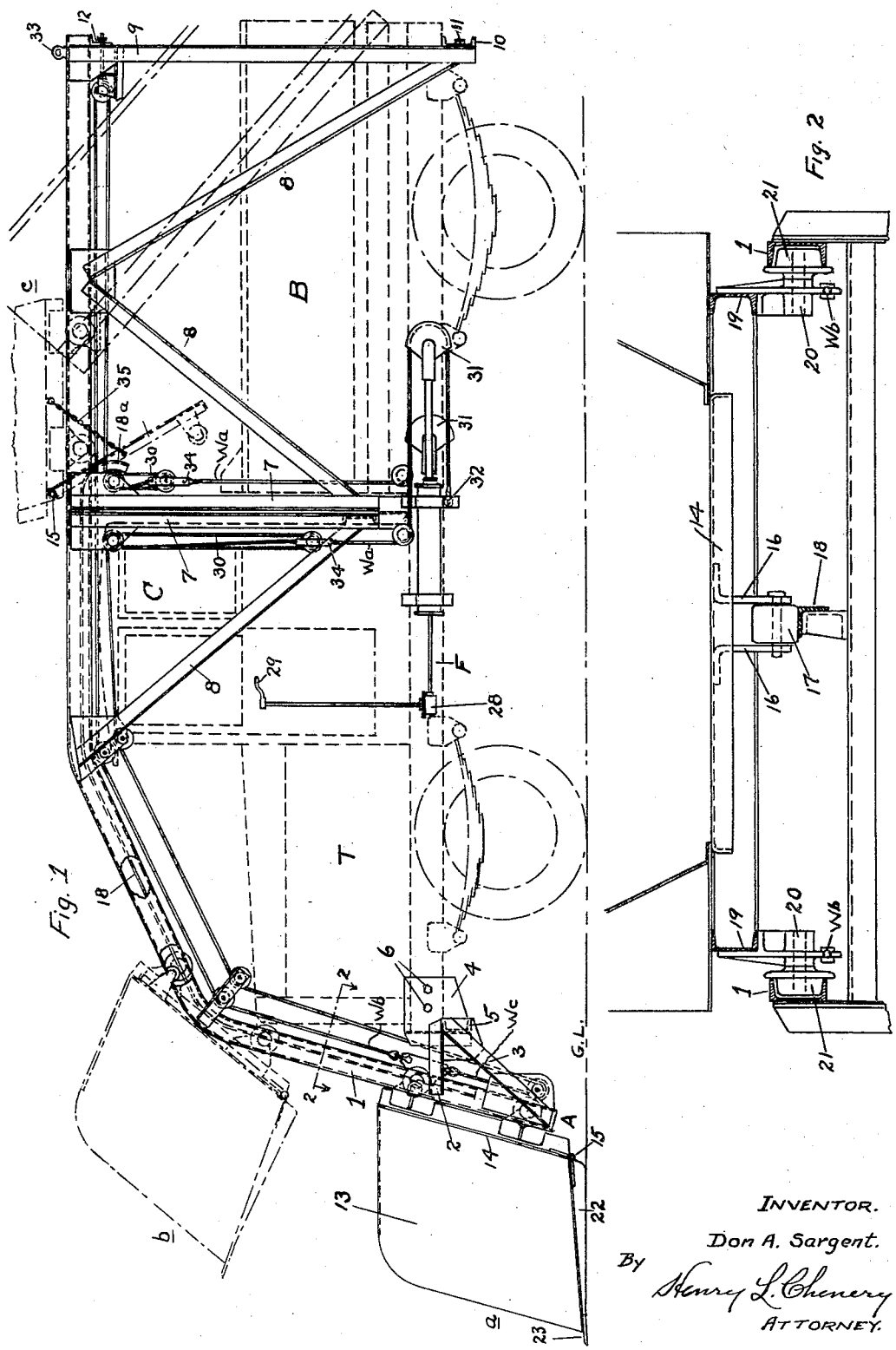
INVENTOR.
Don A. Sargent.
By Henry L. Chenery
ATTORNEY.

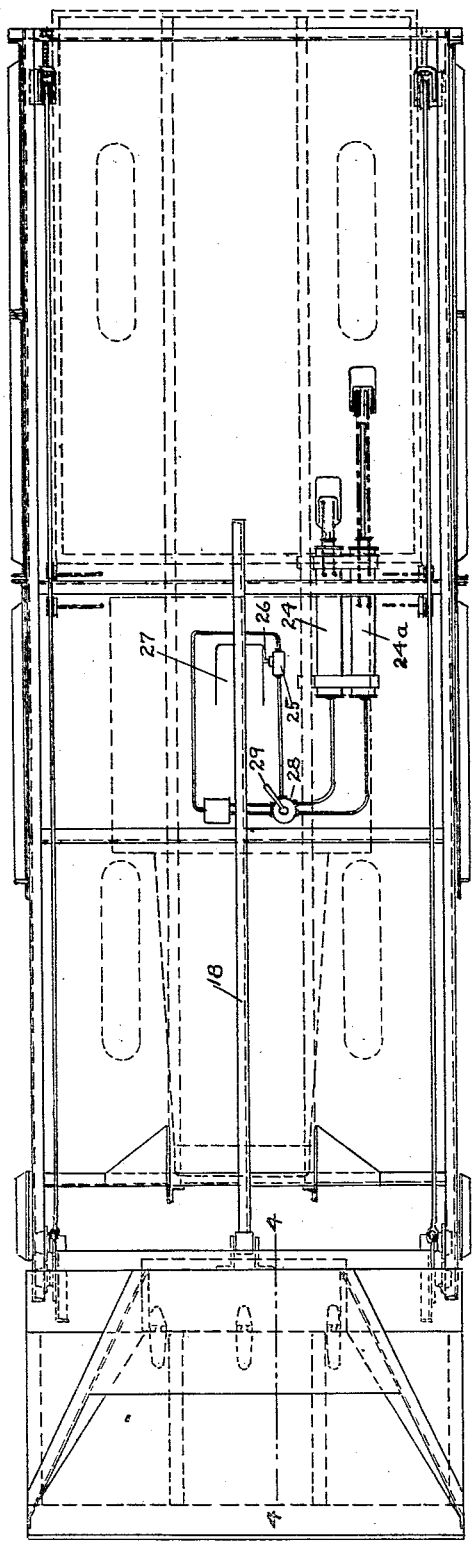

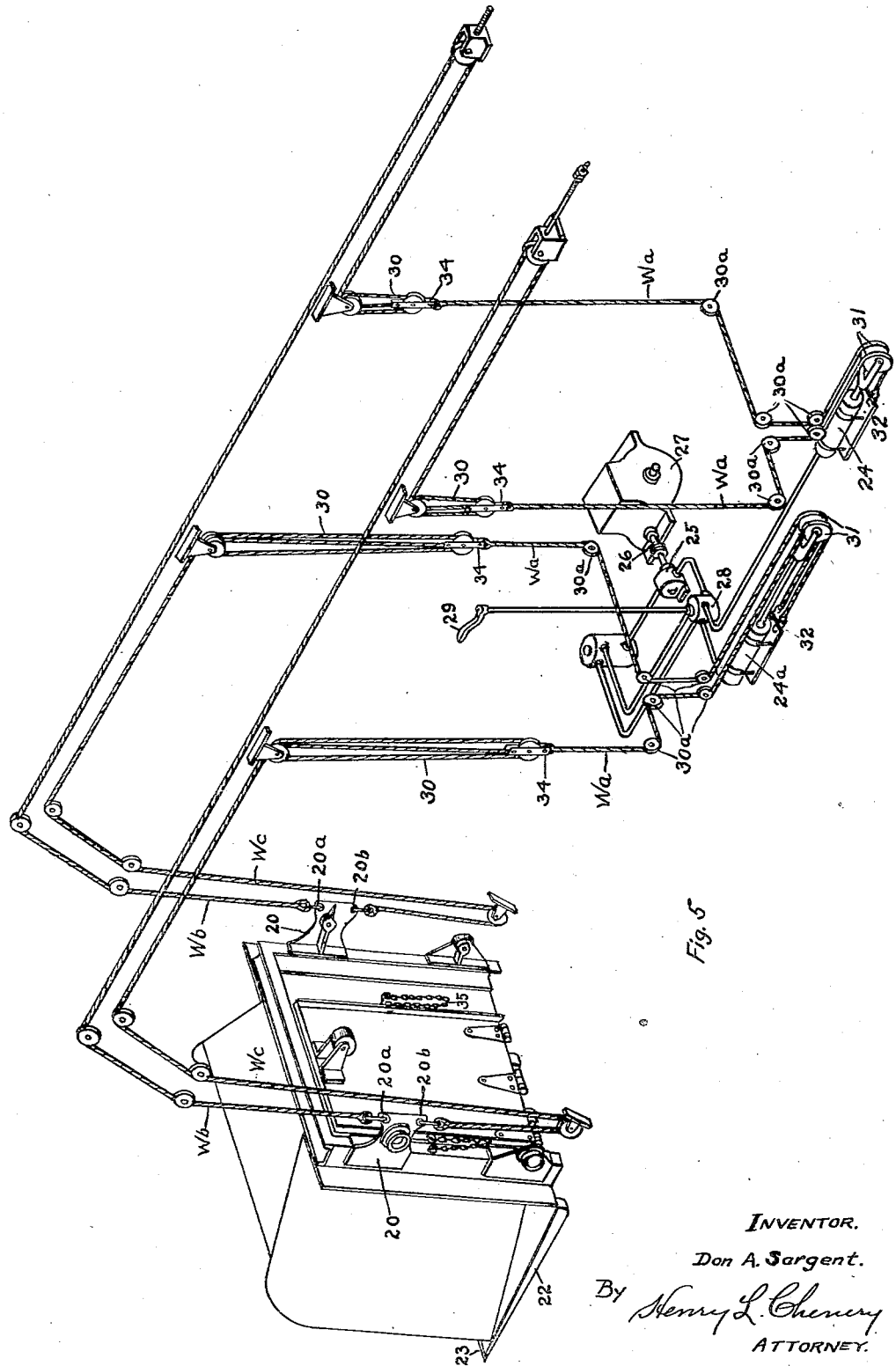

Patented Jan. 16, 1934

1,943,398

UNITED STATES PATENT OFFICE 1,943,398

COMBINED LOADING AND TRANSPORTING EQUIPMENT

Don A. Sargent, Portland, Maine

Application September 19, 1932
Serial No. 633,711

5 Claims. (Cl. 214—65)

The invention hereinafter to be described relates, in general terms, to truck-loading and material-transporting equipment, but deals more specifically with the elevating and conveying portion of the apparatus which is constructed as a self-contained unit, attachable to and detachable from a truck or tractor and used in connection therewith to transfer various materials—as soil, sand, snow or others of like character more or less loosely piled—from the ground to the truck body, in which latter it may be transported to any desired point or destination by the truck.

The general object of my invention is to provide a low-cost, efficiently operating apparatus, capable of fulfilling the above recited requirements and serve as a substitute for the conventional type of equipment ordinarily used for this purpose and which includes, besides the transporting vehicle, an independent single-purpose and unattached machine used solely for elevating the material.

In my arrangement I procure a saving in the original investment cost and also in the subsequent expense of operating the equipment for the reason that a uni-power plant with one-man operation thereof is contemplated, the power to actuate the loader and to operate the truck in transportation service being obtained from one and the same source—the main power plant of the vehicle.

Briefly, my invention embodies in its structure a trackway of somewhat irregular contour, constructed of channel members constituting rails, one being disposed on each side of the truck.

Starting from a point forwardly of the truck and near the ground line, these rails rise in a substantially vertical direction then extend rearwardly in a horizontal one, passing over the truck cab and body—the latter, preferably, being of the "dumping" type. The channels are braced and stayed by structural members and designed to be quickly attachable to or detachable from the frame of the truck, the whole assembled into a unit of somewhat trestle-like form.

A scoop or dipper having guide wheels journalled thereon traverses the track-way through the agency of a system of cables actuated, preferably, by means of hydraulic cylinders deriving their power from a pump driven by a power take-off from the main engine of the truck or tractor.

A door located on the rearward end of the scoop automatically opens when the latter has reached, in its rearward travel, a position directly above the forward end of the truck body, releasing its contents thereinto.

A valve positioned so as to be easily accessible to the operator of the truck controls the action of the cylinders and thereby the movements of the scoop on the track-way; and by operating the valve so as to permit of extended rearward movement of the scoop, its door may be made to serve as a leveller of the material in the truck body.

One advantage of this equipment, as an auxiliary to the truck, resides in its ability to be quickly detached from the truck when it is desired to use the latter for ordinary or strictly trucking purposes.

Various other objects and advantages will be apparent and a better understanding of the character of the invention obtained by reference to the description found in the following specification when taken in connection with the accompanying drawings in which is disclosed an embodiment which, at the present time, I consider preferable to other possible forms in which the invention might be carried out.

In the drawings:—

Fig. 1 is a side elevation of the loading equipment shown mounted on a truck frame;

Fig. 2 is a section taken on line 2—2, Fig. 1;

Fig. 3 is a plan view of the equipment;

Fig. 4 is a section taken on line 4—4, Fig. 3, and

Fig. 5 is a perspective view showing the general arrangement of the cables used to actuate the scoop.

Similar reference characters are employed to identify like parts in all the different views of the drawings.

Referring to the drawings, T represents a truck in its entirety, and B the body, C the cab and F the chassis frame thereof.

Starting from a point A a short distance above the ground line GL are two channel shape elements 1, rising at a slight inclination to permit of the load being lifted more directly, then bending rearwardly and merging into a horizontal portion extending substantially to the rearward end of the truck body B.

The channel elements are transversely spaced to permit the truck body when in its dumping position to pass therebetween, as shown in dotted outline, Fig. 1.

The forward, lower ends of the channels are supported by angles 2 and 3 which are joined to gusset plates 4, the latter being tied to the cross channel member 5. These parts as well also as others which are non-detachably mounted on the truck frame are mutually secured, preferably, by electric welding. Bolting is used only where the parts are to be detached from the frame, one instance being where the gussets 4 are bolted to the chassis frame by bolts 6.

Intermediate the length of the loader on each side of the truck are standards 7 constructed in any approved manner but preferably comprising two angle shapes placed back to back. From these angles extend inclined brace elements 8, 8, connected at their upper ends to the channel 1. Another standard, 9, joins each channel 1, at its rearward end, to a cross channel member 10 by bolts 11, and from the standard 9 is a brace member 8 also connecting with the channel 1 at its upper end. The member 10 is bolted or otherwise secured to the chassis frame F of the truck.

Transversely disposed sway braces (not shown) are employed to interconnect the standards 7 and stiffen the whole structure centrally of its length and these are secured by bolting so as to be easily removed when the truck is being placed in or taken out of the loader structure. An angular cross member 12 permanently ties the rearward ends of the channels 1 together.

13 is the scoop or dipper employed in my apparatus and made in various sizes and shapes suitable for the particular work to be undertaken— as snow, sand or other different materials to be handled.

In form it is to all intents and purposes a box with its front end open and its sides flaring outwardly. It is provided at its rearward end with a door 14 hinged at 15, the door having centrally disposed on it between brackets 16 a roll 17 which rides a centrally positioned rail 18. While the roll is in contact with the rail the door remains closed but upon the scoop in its rearward travel reaching a point on the channels 1 directly over the forward end of the truck body the roll passes off the rail which at that location is slightly bent, as at 18a, and the door is caused to automatically open and permit the scoop to discharge its contents into the truck body, the scoop being shown in position c when the dumping operation is being performed.

On the rear end of the scoop are two vertically disposed channels 19 to each of which are secured two bracketed bearings 20. A shaft operating in each bearing carries a flanged wheel 21, and the four wheels disposed within the spaces between the flanges of the channels 1 guide the scoop as it traverses the rails.

Shoes or runners 22 serve as ground-contacting elements and a cutter blade 23 enables the scoop to be more readily and easily forced into the pile of material to be elevated.

Located at any convenient position within the truck structure and permanently secured thereto are two single-acting hydraulic cylinders 24 and 24a, operably connected to which by proper piping and pipe connections is a rotary pump 25 driven by power taken off the main vehicle engine 27. The arrangement of the piping to and from the various elements in the hydraulic power system is conventional and need not at this time be gone into except superficially. A valve 28 of the multi-port type is actuated by a handle 29 placed in the cab of the truck, accessible to the driver, and through this means control of the action of the cylinders—and the movements of the scoop, can be had.

Cylinder 24, as will be seen by reference to Fig. 5, acts to raise the scoop and the cylinder 24a to return it to the ground through a system of cables, the multi-ported valve allowing one cylinder to by-pass the oil by which it is operated while the other cylinder is in active service.

It will be observed that a large increase of travel of the scoop as compared with the stroke of the pistons in the cylinders is required and is procured by reversing the action of the hoisting tackle from that ordinarily used in hoisting gears. In other words, to obtain the necessary length of travel of the scoop the power must be applied on the shorter leveraged end of the tackle—or the portions Wa, Wa of the cables, resulting in a greatly increased movement of the portions Wb and Wb thereof. The tackle blocks 30 may be made double, triple or in fact of any number of sheaves required to acquire the proper speed and movement of the scoop. Looping the cables around the piston-head sheaves 31 and anchoring the end of the cable at 32 results in a differential increase in speed of the tackle blocks of double that which would obtain were the cables attached directly to the piston heads.

Extensions on the bracketed bearings 20 carry shackles 20a to which the ends of the scoop elevating portions Wb, Wb of the cables are attached, and shackles 20b secured on the same extensions are fixed on the ends Wc, Wc of the scoop-return-movement portion of the cables.

Idler sheave leaders, such as 30a which change the direction of movement of the cables adjacent the hydraulic cylinders are fixtures on some portion of the truck chassis; all other leaders, blocks and cable attachments in the equipment are secured on the loader apparatus.

In detaching the loading structure from the truck the work will be greatly facilitated if the whole equipment is moved into a building, garage or under a scaffold—in fact in any place where an overhanging beam is available, and from which the rear end of the equipment may be suspended from slings attached to the eye-bolts 33, with the forward end blocked up at A.

This done, all bolted connections between the truck and the loader are freed, the shackle pins 34 drawn, the sway braces between the standards 7 and the cross member 10 removed, after which the truck may be backed out of the skeleton form of the loader and used for any ordinary trucking work. The operation of my loading and transporting equipment is so simple that a truck driver of ordinary intelligence can master it with but very little instruction.

The operator of the truck drives his vehicle to the pile of material to be moved, lowers the scoop to the ground line by actuating the lever 29 which controls the movement of both of the hydraulic plungers, then starts his truck forwardly so that the scoop enters the pile of material. This lowering operation is accomplished by and through the agency of the hydraulic cylinder and plunger 24a.

Now by swinging the lever in the opposite direction the other plunger in cylinder 24 acts and the scoop is raised almost perpendicularly at first, or until well clear of the pile. Continuing its movement rearwardly on the channel rails the scoop arrives at a point directly over the truck body, at which position the roll 17 on the scoop door passes off the bent end of the central rail 18 allowing the door to open and the scoop to discharge its load into the truck body.

Should the valve, when positioned to elevate the scoop, remain open until the piston or plunger for this particular service has travelled or completed its full stroke, the scoop would continue its movement to the ends of the channel rails and the door depending from the scoop and held to a limited amount of opening by the chains 35 would act, meanwhile, as a leveller of the heaped up material in the truck body.

On each successive scoop-load of material elevated the truck is moved ahead, further into the pile; or it may be maneuvered into any position to take the material from any portion of the pile desired.

The apparatus, a description of which has just been set forth is especially designed and constructed to handle certain kinds of work to better advantage than can be accomplished with the so-called "power digger" type of equipment. The latter is a heavy, cumbersome and single-purpose machine, built primarily for excavating purposes, but, due to the fact that heretofore there has been no commercial apparatus available which was just suited for handling loosely piled material, these more expensive outfits have, as a matter of expediency, been used for other loading methods than those for which they were particularly and primarily designed, or intended.

My equipment is what might be called a "self-loader" in that no other or independent agency is required to do the loading. It is admirably adapted for the removal of snow from city streets or from highways where the snow is required to be transported for some distance; it is by far the handiest and most efficient device for transporting sand or gravel from the pit, or crushed rock from the rock-crushing plant to any road job under construction, and its cost is so low as to render its acquisition by any contractor possible. Furthermore, its use will be accompanied by a great saving in operating costs.

I claim,

1. In a loading equipment adapted to be demountably installed on a motorized vehicle having a body therefor, comprising a non-endless track-way, including two channel members relatively spaced and extending from a location immediately above the ground line upwardly at a rearward inclination and thence horizontally over the said vehicle to the rearward end thereof, a scoop having an imperforate bottom and two sides, means on said scoop adapted to engage said channel members and guide it as it traverses said members, a door hinged on the rearward end and at the bottom of said scoop, means to hold said door closed until said scoop, in its rearward movement, reaches a predetermined location on the horizontal portions of said channel members, and means, positively acting in both directions and having interconnection with the propulsion power unit for said vehicle, to move said scoop along said track-way.

2. In apparatus of the class described adapted to be employed in association with the chassis frame and the propulsion power unit of a motorized vehicle having a truck body therefor, comprising in combination, two members spaced from the ground line and from each other and rising in a rearwardly inclined direction, forwardly of said vehicle, and continuing in a horizontal direction over and to the end of said truck body, means to detachably secure said members to said vehicle, a scoop, having open front and rear ends, two sides and an imperforate bottom, adapted to traverse said members, a door making hinged connection with said scoop at its rearward, lower end, a rail disposed between said members, extending from the lower ends thereof to a location on their horizontal portions substantially vertically over the forward end of said truck body, a roll on said door adapted to engage said rail for the purpose of holding said door closed during a predetermined distance of the movement of said scoop along said members, means to automatically open said door, and means, acting positively, to actuate said scoop in each direction.

3. In apparatus of the class described comprising in combination with the chassis frame and power plant of a motor vehicle having a body therefor, two channel members of irregular contour, their forward ends spaced from the ground and rising forwardly of said chassis frame in a rearwardly inclined direction and continuing rearwardly and horizontally over said vehicle, standards demountably secured to said chassis frame adapted to support said channel members, sway brace elements transversely bracing said standards, a scoop having an open front end, a door hinged on the rearward end of said scoop, wheels revolubly mounted on the rearward end of said scoop, on each side thereof outwardly of said door, said wheels adapted to engage and operate in said channel members, cables secured to said scoop adapted to elevate it on the inclined portions of said channel members and along the horizontal portions thereof, and means to actuate said cables.

4. In apparatus of the class described adapted to be mounted on the chassis frame of a motor vehicle comprising in combination with the power plant therefor, two channel members, one on each side of said vehicle, starting forwardly thereof above the ground line and rising in a direction slightly inclined from the vertical and continuing over the top of said vehicle rearwardly to its end, a scoop having an open front end, two wheels revolubly mounted on each side of the rear end of said scoop and vertically spaced thereon, said wheels adapted to operate within said channel members to support and guide said scoop as it traverses said members, a door hinged at its bottom end to said scoop, a roll revolubly mounted on said door, a rail centrally disposed between said channel members and extending from the inclined portions rearwardly along the horizontal portions thereof and terminating in a downwardly bent end spaced from the rearward ends of said channel members, said roll in operation adapted to engage said rail and hold said door closed until released by said roll passing over said bent end, a cable on each upper side of said scoop adapted to raise and traverse it along said channel members, a cable on each lower side for the purpose of returning it to its ground line position, and means to actuate said cables.

5. In apparatus of the class described comprising in combination with a motorized vehicle having two plunger-equipped cylinders operable by power taken from the propulsion power unit for said vehicle, and a truck body for said vehicle, a channel-member track-way rising from a location immediately above the ground line, forwardly of said vehicle, and extending rearwardly over and to the back end of said truck body, a material-holding scoop having open front and rear ends, guide wheels on said scoop adapted to engage, respectively, the two channel members in said track-way, a door hinged on the rearward end of said scoop, a single rail disposed intermediate said channel members and terminating short of the rear end of said track-way, a roll on said door engaging said rail to hold said door in closed position, means to automatically open said door at a predetermined location on said track-way, stop means to prevent further swinging of said door when opened and while serving as a material leveller, cables extending from the upper portions of said scoop to the plunger in one of said plunger-equipped cylinders, to raise and advance said scoop and cables interconnecting the bottom portions of said scoop with the other of said plungers, to return said scoop to its loading position.

DON A. SARGENT.